Aug. 21, 1928.
E. H. GOLD ET AL
1,681,729
HOSE COUPLER
Filed June 21, 1926   3 Sheets-Sheet 3
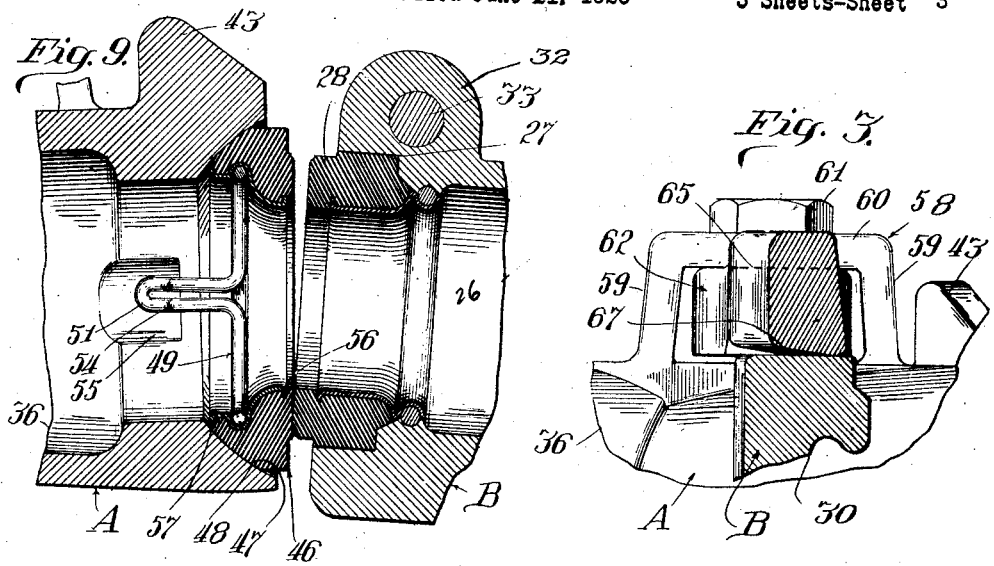
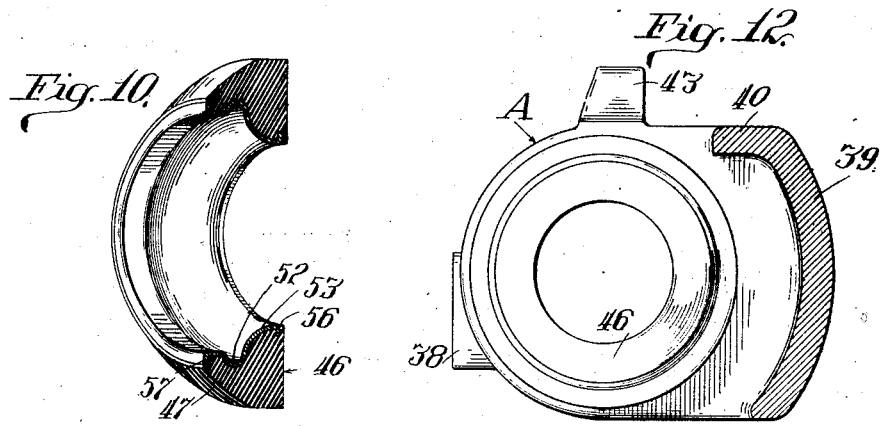
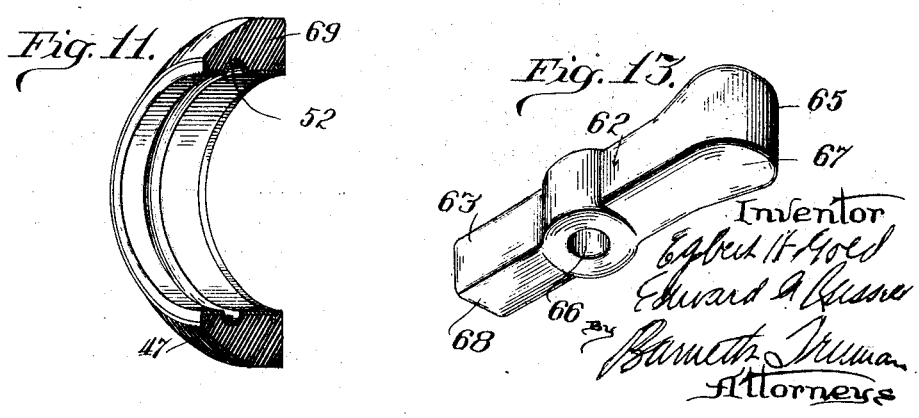

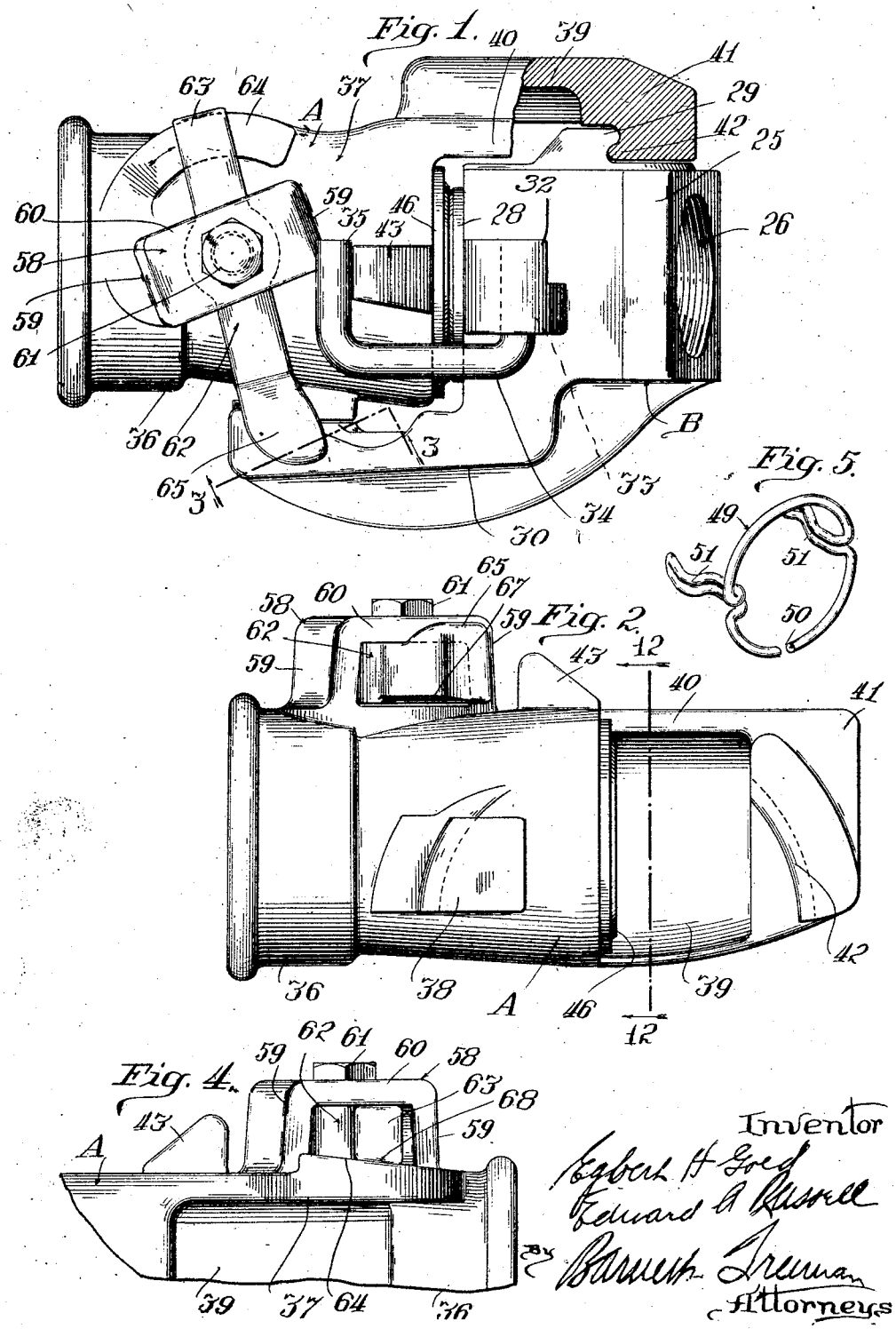

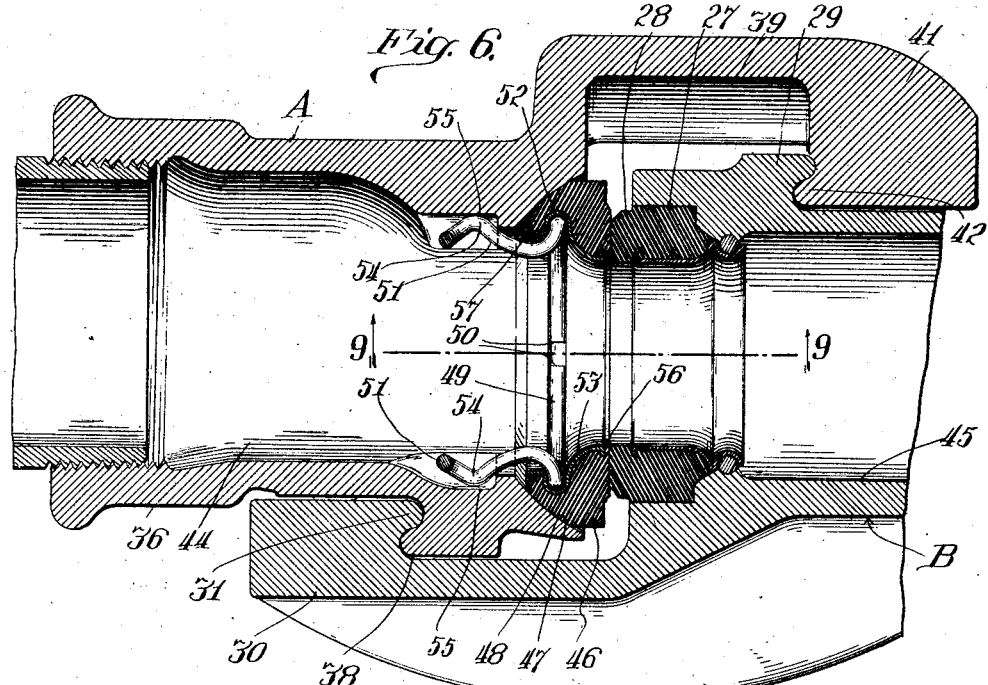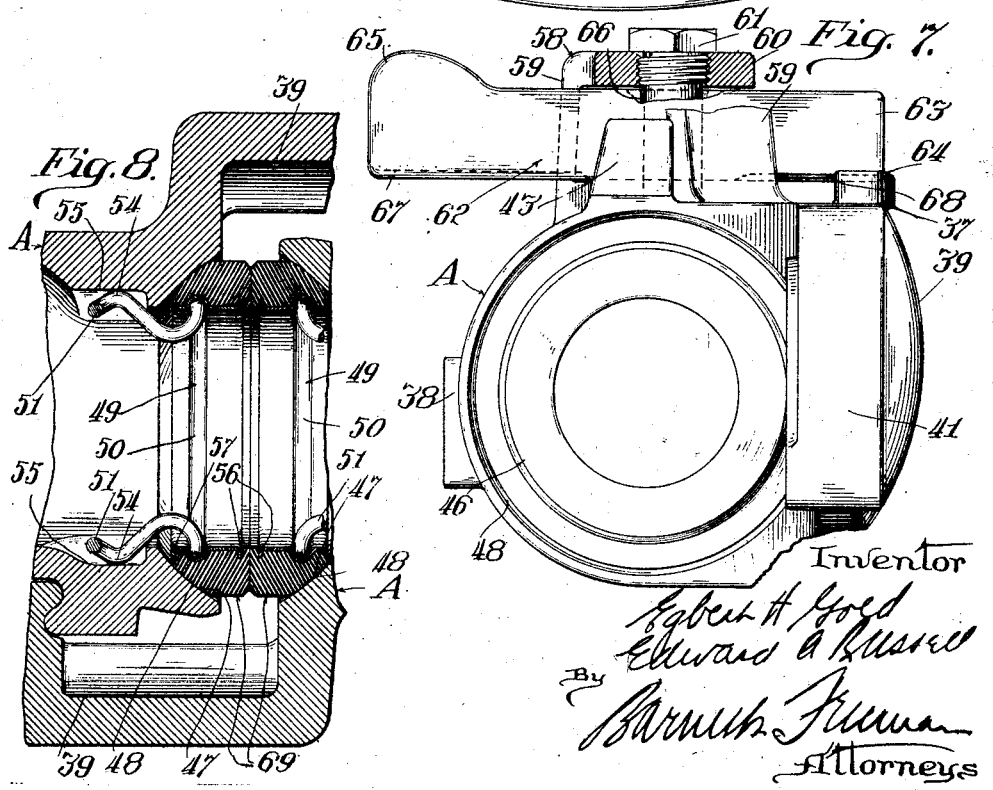

Patented Aug. 21, 1928.

1,681,729

UNITED STATES PATENT OFFICE.

EGBERT H. GOLD, OF EVANSTON, AND EDWARD A. RUSSELL, OF CHICAGO, ILLINOIS; SAID RUSSELL ASSIGNOR TO VAPOR CAR HEATING COMPANY, INC., OF CHICAGO, ILLINOIS, A CORPORATION OF NEW YORK.

HOSE COUPLER.

Application filed June 21, 1926. Serial No. 117,431.

This invention relates to a hose coupler and the principal object is to make certain improvements upon hose couplers of the type now commonly used for connecting together the hose (or equivalent flexible metal connectors) on the ends of the steam train pipes of railway cars. The improvement consists in the provision of the coupler with an effective locking device which will not injure the gasket or tend to bend or mutilate the arms or cam lugs of the coupler or its mate.

The invention is illustrated in a preferred embodiment in the accompanying drawings, wherein Fig. 1 is a plan view, with a part in section, of a coupler constructed in accordance with our invention, shown as mated with a coupler of known construction.

Fig. 2 is a side elevation of the improved coupler.

Fig. 3 is a detail sectional elevation on line 3—3 of Fig. 1.

Fig. 4 is a fragmentary elevation of the coupler showing the other side from that shown in Fig. 2.

Fig. 5 is a view in perspective of the device employed for retaining the gasket of the coupler in its seat.

Fig. 6 is a longitudinal sectional plan view of the couplers shown in Fig. 1.

Fig. 7 is an end view of the coupler showing its outer or gasket end.

Fig. 8 is a fragmentary sectional plan view illustrating the mating of two couplers both of the improved type.

Fig. 9 is a longitudinal sectional view on line 9—9 of Fig. 6, but showing the couplers during the act of coupling or uncoupling.

Figs. 10 and 11 are sectional perspectives of gaskets, the gasket of Fig. 10 being employed when the improved coupler is mated with a coupler having a smaller port diameter and the gasket of Fig. 11 being used when the coupler is mated with a coupler of its own port diameter.

Fig. 12 is a sectional view on line 12—12 of Fig. 2, and

Fig. 13 is a view in perspective of the locking member for locking the coupler to its mate.

The coupling as shown in Figs. 1, 6 and 9, consists of a pair of couplers A and B, coupler A embodying the improvements of our present invention and coupler B being a type of coupler in service, known as the S–4 coupler.

Coupler B consists of a head 25 formed with a steam port 26 provided at its outer end with a seat 27 for a gasket 28. On one side of the coupler head 25 is an undercut cam lug 29 and from the other side of the head projects an arm 30 formed with a cam lug 31. On the top of the head 25 is a lug 32 in which is pivoted the bent over end 33 of a locking link 34, the other end of which also has a right angle bend 35 adapted to engage a lug on the mating coupler corresponding to lug 32.

Coupler A embodying the improvement of the present invention, consists of a head 36 of generally cylindrical shape formed on the top with a flat web 37. On one side of the head is a cam lug 38 adapted to be engaged by the cam lug 31 on the arm 30 of coupler B. From the other side of the head projects an arm consisting of an outwardly curved or concavo-convex web 39 formed with an inturned flange 40 and at its outer end with a thickened portion 41 provided with an undercut cam lug 42 to engage the lug 29 on coupler B. Coupler A may, if desired, be formed on its upper surface with a lug 43 to be engaged by the locking link 34 of coupler B.

The port 44 of coupler A is shown as having a larger diameter than the port 45 of coupler B. The standard port diameter for steam train pipe couplers, as exemplified by coupler B, is one and one-half inches. Coupler A is intended to have a port diameter of two inches. Since coupler A must mate with couplers of the standard size, the perpendicular distance between its cams must be the same as the perpendicular distance between the cams of the smaller couplers. On the other hand, the larger port diameter necessitates the use of a gasket of like diameter, and it is for this reason that the arm of coupler A has been made concavo-convex instead of consisting of a straight web reinforced with a projecting rib as in the case of coupler B. Moreover, the curved construction gives the arm rigidity, as against the thrust of the locking member, to be hereinafter described, without using an excessive amount of metal. The larger port diameter also makes it impractical to use a gasket of the type of gasket 28 of coupler B. For this reason and for other more important reasons which will be adverted to, the gasket of coupler A is formed externally with a ball or spherical surface and seats in a correspondingly formed recess in the coupler head. That is, the gasket designated 46, and which may be made of the customary rubber composition (Jenkins material), is formed externally with a spherical surface 47, which fits the spherical surface 48 formed at the outer end of the coupler port 44. By this arrangement the gasket may oscillate in its seat, and to permit this oscillation on an axis corresponding to the horizontal diameter of the port, whereby the gasket can yield at the bottom during coupling and uncoupling operations, and to make provision for retaining the gasket in its seat when the coupler is not mated with another coupler, a retaining device is used constructed preferably as shown in Figs. 5, 6 and 9. This device consists of a single piece of wire bent to form a ring 49 having a gap at 50, and a pair of spring fingers 51 made by return bent loop portions of the wire. The ring portion of the retainer fits into a groove 52 in the metal ferrule or armoring 53 with which the inner surface of gasket 46 is armored. The spring fingers 51 are formed with bends 54 adapted to enter recesses 55 formed in the coupler port at the extremities of the horizontal diameter of the port. The couplers in mating are rocked on their interlocking cams shown in Fig. 9. The gasket faces are brought into contact first at the bottom points of the gasket. By forming and seating gasket 46 so that it can oscillate on a line corresponding to the horizontal diameter of the coupler port, the lower part of the gasket can yield during the operation of coupling or uncoupling, and this obviates any possibility of the gasket being crushed or mutilated during such operations. Moreover, the gasket is self-seating against the gasket of the mating coupler so that if the couplers when locked together are not in perfectly accurate alignment, that is, if the axes of their ports, instead of being on a straight line are at a slight angle to each other, as may happen through wear on the cam lugs, the gaskets will nevertheless bear flatwise one on the other, so as to insure a steam tight joint between the couplers. Preferably the curved surface of the gasket, as shown in the drawings, is of less width than the curved surface forming the gasket seat, so that the gasket may oscillate on its seat without any portion of the curved surface of the gasket leaving the seat. If the gasket were rocked beyond its seat, in adjusting itself to the other gasket and then the couplers were locked together under heavy locking pressure, the curved surface of the gasket might be cut or indented or otherwise deformed, especially because, in addition to the pressure exerted by the lock, the gaskets are subject to expansion under the heat of the steam.

It will be seen from Figs. 6 and 9, that gasket 46 has an external diameter considerably larger than the external diameter of the gasket 28 of coupler B, while the internal diameters of the two gaskets are about the same. Gasket 46 is formed, in fact, with a face portion which has an internal diameter considerably less than the internal diameter of the inner or seating portion of the gasket. As a result, the pressure of the smaller gasket 28 is likely to break out the inwardly projecting part of gasket 46. To prevent this, gasket 46 is provided with the metal armoring 53 above referred to, which covers the entire inner surface of the gasket and has flanges 56, 57, as well as the grooved portion 52 referred to, firmly imbedded in the plastic material forming the body of the gasket. This armoring takes the thrust of the other gasket.

The coupler is provided with locking means preferably constructed as follows: 58 is a bracket or housing on the web 37 consisting of uprights 59 and a cross web 60. The latter has a threaded perforation for a pivot stud 61 on which is pivoted a locking member 62, one end 63 of which is adapted to move over an arcuate wedging surface 64 formed on the web 37 of the coupler head and the other end 65 of which is adapted, on rotation of the locking member, to be brought to bear upon the upper surface of the arm 30 of the mating coupler. The hole 66 in the locking member is large enough to allow a certain play on the pivot stud 61 so that as one end of the locking member rides up the wedge 64, the other end is thrust downwardly upon the arm of the mating coupler. That is, the thrust of the locking member on the arm is, in the main at least, a downward thrust substantially in the plane of the interlocked cams. This action minimizes the tendency of the lock to bend the arm outwardly. The use of certain known types of wedging locks has brought about considerable bending and distortion of the coupler arms, together with some mutilation and bending of the locking cams. Distortions of this sort, even if they do not prevent the coupler from being interlocked with another coupler, involve necessarily disturbing the parallel relationship between the gasket faces, or at least the offsetting of one face with respect to the other, and this results in mutilation of the gasket faces. Preferably the under side of the locking member 62 is beveled oppositely at opposite ends of the member providing a slightly inclined surface 67 (Fig. 3) to bear against the arm of the mating coupler and an oppositely inclined surface 68 (Fig. 4), to bear on the wedge 64.

Fig. 8 illustrates the mating of two identical couplers of the improved type. These couplers are provided with gasket 69 shown in detail in Fig. 11.

*Operation.*—The couplers, whether both are of the improved type or only one of them, are coupled together by a rocking movement of one on the cams of the other, as illustrated in Fig. 9. The lower portions of the gaskets come into contact first, and with both the gaskets fixed in their coupler heads, the gaskets will necessarily have to be compressed, at this place, one against the other, as the couplers are rocked into alignment. By mounting the gasket 46 so that it will oscillate on an axis corresponding to the horizontal diameter of the coupler port, the lower portion of the gasket will yield, during the rocking movements of the coupler, so that pressure between the gaskets at this place is relieved. When the couplers are rocked into alignment, or substantial alignment, the locking member 62 is rotated in the direction of the arrow (Fig. 1). The end 63 of the locking member rides up the wedge 64 and this forces the other end of the locking member downwardly upon the upper surface of the arm 30 of the mating coupler. The pressure thus exerted on the coupler arm is approximately in the direction of the cams, the active edges of which are vertical, so that there is little danger of the arm of the mating coupler being sprung or bent. Where two couplers of the improved type are coupled as indicated in Fig. 8, the construction of the arm resists any tendency there may be to strain under the pressure exerted by the lock. Locks of this type are ordinarily driven into place by a hammer, so that the pressure which they exert may be considerable. A great deal of difficulty has been experienced through the bending of the arms of couplers of the type indicated, and through the bending and mutilation of the interlocking cams as a result of force applied in locking the couplers together. If the coupler arm is bent even slightly or the cams mutilated or distorted, the gasket faces of interlocked couplers will be either offset or out of parallelism with each other, or both, as a result of which the gaskets are mutilated and a steam tight fit between their faces becomes impossible. This difficulty is minimized by the provision of a lock which acts vertically on the coupler arm of the mating coupler, and, moreover, slight distortion of the coupler can be taken care of by the capacity of the gasket to oscillate in its seat. It will be understood that while the rocking movements of greater amplitude are on an axis corresponding to the horizontal diameter of the coupler port, the retaining device being resilient will allow the gasket to yield to a certain extent as against pressure applied at any point. If the cams of the couplers are worn, or if the gaskets are, through wear or for other reasons, shorter than they should be, the pressure of the lock will rock the couplers beyond the place of perfect alignment, but if the gasket can oscillate in its seat, it will adjust itself to this malalignment of the couplers provided it is not excessive. In other words, the lock can be driven to such a point as will bring the coupler faces flatwise one against the other to perfectly seal the joint between the couplers, because of the capacity of the gaskets in one or each of the couplers to rock on a spherically curved seat.

To adapt the large bore coupler A to couplers of standard size, such as exemplified by the coupler B, (Figs. 1, 6 and 9), the gasket 46 (Fig. 10), is used. When coupler A is to be coupled with another coupler of the same port diameter, gasket 69 (Fig. 11), will be substituted for gasket 46. The same gasket retaining device can be used.

It will be noted that the spring fingers 51 of the wire retainer lie closely against the walls of the coupler port, and that no portions of the retainer extend across or obstruct the port opening. This is very advantageous, since it has been found that wires or similar parts extending into or across the port opening cause considerable frictional resistance to the passage of steam, and may even cause the gasket and retainer to be blown away at the rear end of the train line when the line is blown out. Also, pieces of hose or other solid matter might lodge against such cross wires and block the line. The improved retainer here shown does not extend into the port passage, and therefore offers no resistance to the passage of steam or solid matter.

The improved gasket and gasket-retaining device are not claimed specifically herein but are made the subject matter of, and claimed in, a divisional application filed June 20, 1927, Serial No. 200,032.

We claim:

1. In combination with a hose coupler comprising a head formed on one side with a cam lug and an arm projecting forwardly from the other side of the head and adapted to engage a cam lug of a mating coupler, the mating couplers being engaged with one another by a downward swinging movement of the forwardly projecting arms, a locking member pivoted to the top of the hose coupler for rotation to locking position so that one end thereof will engage the upper surface of the arm of the mating coupler and move along the arm toward its free end so as to gradually force the arm downwardly into engagement with the cam lug and lock it in this position.

2. In combination with a hose coupler comprising a head formed on one side with a cam lug and an arm projecting forwardly from the other side of the head and adapted to engage the cam lug of a mating coupler, the mating couplers being engaged with one another by a downward swinging movement of the forwardly projecting arms, there being a wedge surface formed on the upper surface of the head, and a locking member intermediately pivoted to the top of the hose coupler for rotation to locking position so that one end thereof will move forwardly up the wedge surface and the other end will swing rearwardly and downwardly to engage the upper surface of the arm of the mating coupler and move along this arm toward its free end to gradually force the arm downwardly into engagement with the cam lug and lock it in this position.

3. In combination with a hose coupler comprising a head, a locking member intermediately swiveled on the head so that it may tilt at right angles to its plane of rotation whereby one projecting end of the member may be swung over a portion of a mating coupler, and means engaged by the other end of the locking member during this swinging movement for simultaneously tilting the first mentioned projecting end into engagement with the mating coupler.

4. In combination with a hose coupler comprising a head, a locking member intermediately swiveled on the head so that it may tilt at right angles to its plane of rotation whereby one projecting end of the member may be swung over a portion of a mating coupler, and a cam surface on the head engaging the other end of the locking member for tilting the first mentioned projecting end into engagement with the mating coupler.

5. In combination with a hose coupler comprising a head, a wedge surface on the head, and a forwardly projecting arm, a bracket on the head, a locking bar intermediately pivoted within the bracket so that when rotated in one direction one end will ride up the wedge surface and the other end will swing over the forwardly projecting arm of a mating coupler, the pivotal connection being so formed as to permit the bar to tilt at right-angles to its plane of rotation whereby it may fulcrum against the bracket when one end rides up the wedge surface thus forcing the other end downwardly into locking engagement with the mating coupler.

6. In combination with a hose coupler comprising a head, a wedge surface on the head, and a forwardly projecting arm, a locking member swiveled on the head for universal movement so that when rotated in one direction it will engage the wedge surface and a projecting portion of the locking member will be forced outwardly and downwardly into locking engagement with the arm of a mating coupler.

7. In combination with a hose coupler comprising a head, a locking member swiveled on the head so that when rotated in one direction a portion of the member will swing into engagement with a mating coupler, and means on the head engaged by another portion of the locking member for tilting the member at right angles to its plane of rotation into firm locking engagement with the mating coupler.

8. In combination with a hose coupler comprising a head formed on one side with a cam lug and on the other side with a forwardly projecting arm adapted to engage the cam lug of a mating coupler, a locking bar intermediately pivoted on the head so that it may tilt at right angles to its plane of rotation, and a wedge surface on the head for tilting one end of the bar upwardly when rotated in one direction whereby the opposite end is forced downwardly into engagement with the arm of a mating coupler.

9. In combination with a hose coupler comprising a head formed on one side with a cam lug and on the other side with a forwardly projecting arm adapted to engage the cam lug of a mating coupler, a bracket on the head, a pivot pin in the bracket, a locking bar intermediately pivoted loosely on the pin so that it may tilt at right angles to its plane of rotation, and a wedge surface on the head that is engaged by one end of the bar when rotated in one direction whereby the other end of the bar will be swung over the arm of a mating coupler and tilted downwardly into locking engagement with the arm.

EGBERT H. GOLD.
EDWARD A. RUSSELL.